(12) United States Patent
Brock et al.

(10) Patent No.: US 8,879,583 B1
(45) Date of Patent: Nov. 4, 2014

(54) RADIO FREQUENCY CONDITIONING UNIT

(71) Applicant: The United States of America as represented by the Secretary of the Navy, Washington, DC (US)

(72) Inventors: David W. Brock, San Diego, CA (US); Lawrence T. Short Bull, San Diego, CA (US); Hale B. Simonds, Santee, CA (US); Charles E. Dempsey, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 117 days.

(21) Appl. No.: 13/759,946

(22) Filed: Feb. 5, 2013

(51) Int. Cl.
*H04J 1/00* (2006.01)
*H04B 1/10* (2006.01)

(52) U.S. Cl.
CPC ....................................... *H04B 1/109* (2013.01)
USPC ........................................... 370/480; 375/346

(58) Field of Classification Search
USPC .................................... 370/480; 375/346, 340
See application file for complete search history.

(56) References Cited

U.S. PATENT DOCUMENTS

| | | | |
|---|---|---|---|
| 2,747,029 A | 5/1956 | Abbett | |
| 5,133,001 A * | 7/1992 | Bohm | 455/464 |
| 5,457,688 A * | 10/1995 | Andersen | 370/449 |
| 5,486,830 A * | 1/1996 | Axline et al. | 342/43 |
| 5,838,675 A | 11/1998 | Rauscher | |
| 6,107,898 A | 8/2000 | Rauscher | |
| 7,719,384 B1 | 5/2010 | Arceo | |
| 7,983,637 B2 | 7/2011 | Kayano | |
| 2010/0296816 A1 * | 11/2010 | Larsen | 398/116 |
| 2012/0054819 A1 * | 3/2012 | Alkan et al. | 725/153 |
| 2012/0063550 A1 * | 3/2012 | Chang et al. | 375/340 |

OTHER PUBLICATIONS

Paladin, G.J. and Sugarman, R.N., "Interference Blanker for HF Receivers", Electromagnetic Compatibility Symposium Record, IEEE, pp. 62-67, 1969.
Newman, M. M. Stahman, J.R., and Robb, J.D., "ADF Interference Blanker Development", IRE Trans. on Aeronauticai and Navigation ELectronics, pp. 86-91, 1958.

* cited by examiner

*Primary Examiner* — Albert T Cho
(74) *Attorney, Agent, or Firm* — SPAWAR Systems Center Pacific; Kyle Eppele; Ryan J. Friedl

(57) ABSTRACT

A system and method are provided for conditioning a received signal prior to transmission. The signal is separated into different signal components in respective contiguous frequency channels. Each signal component is routed through either time domain or frequency domain processing circuitry and simultaneously a sample of the signal component is routed through control signal generation circuitry. The time domain processing circuitry contains a delay such that if any portion of the signal component exceeds a reference voltage signal, a switch is opened using a control signal generated by the control signal generation circuitry to blank that portion of the signal for that particular frequency channel. The outputs of each frequency channel are then combined into an output signal for transmission. A processor may be used to automatically configure various components within the time domain and frequency domain processing circuitry to prevent excessive power signals from being transmitted.

20 Claims, 10 Drawing Sheets

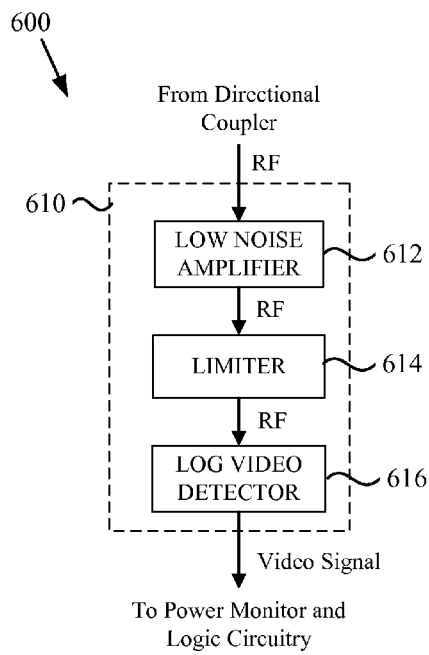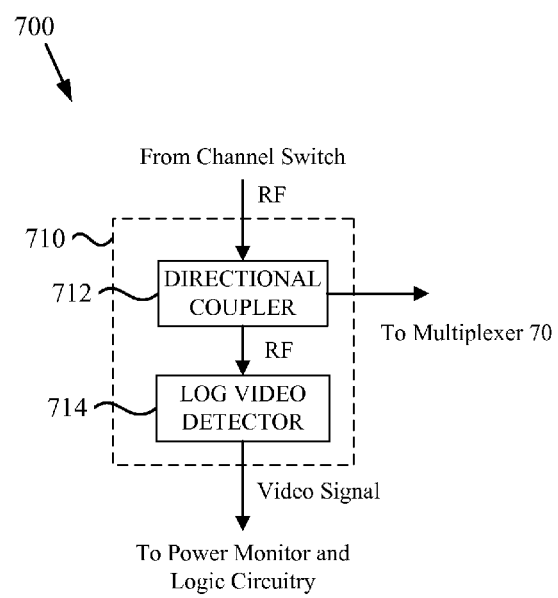
FIG. 6
FIG. 7

RADIO FREQUENCY CONDITIONING UNIT

FEDERALLY SPONSORED RESEARCH AND DEVELOPMENT

The Radio Frequency Conditioning Unit is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email sc_pac_T2@navy.mil. Reference Navy Case No. 101966.

BACKGROUND

In some systems, a blanking control signal from the RF interference source can be used to blank unwanted signals at the receivers. This blanking control signal will be delayed and distorted by long cable runs causing timing issues with the RF signal and blanking control signal. The length of the cable runs will be site dependent making each installation unique. In addition, some systems do not provide a blanking control signal. It is desirable to have a system that provides a compact and efficient solution for eliminating impulsive interference.

BRIEF DESCRIPTION OF THE DRAWINGS

FIG. 6 is a block diagram illustrating an embodiment of input power detection circuitry for use within the Radio Frequency Conditioning Unit.

FIG. 7 is a block diagram illustrating an embodiment of output power detection circuitry for use within the Radio Frequency Conditioning Unit.

DETAILED DESCRIPTION OF SOME EMBODIMENTS

Figure 1:
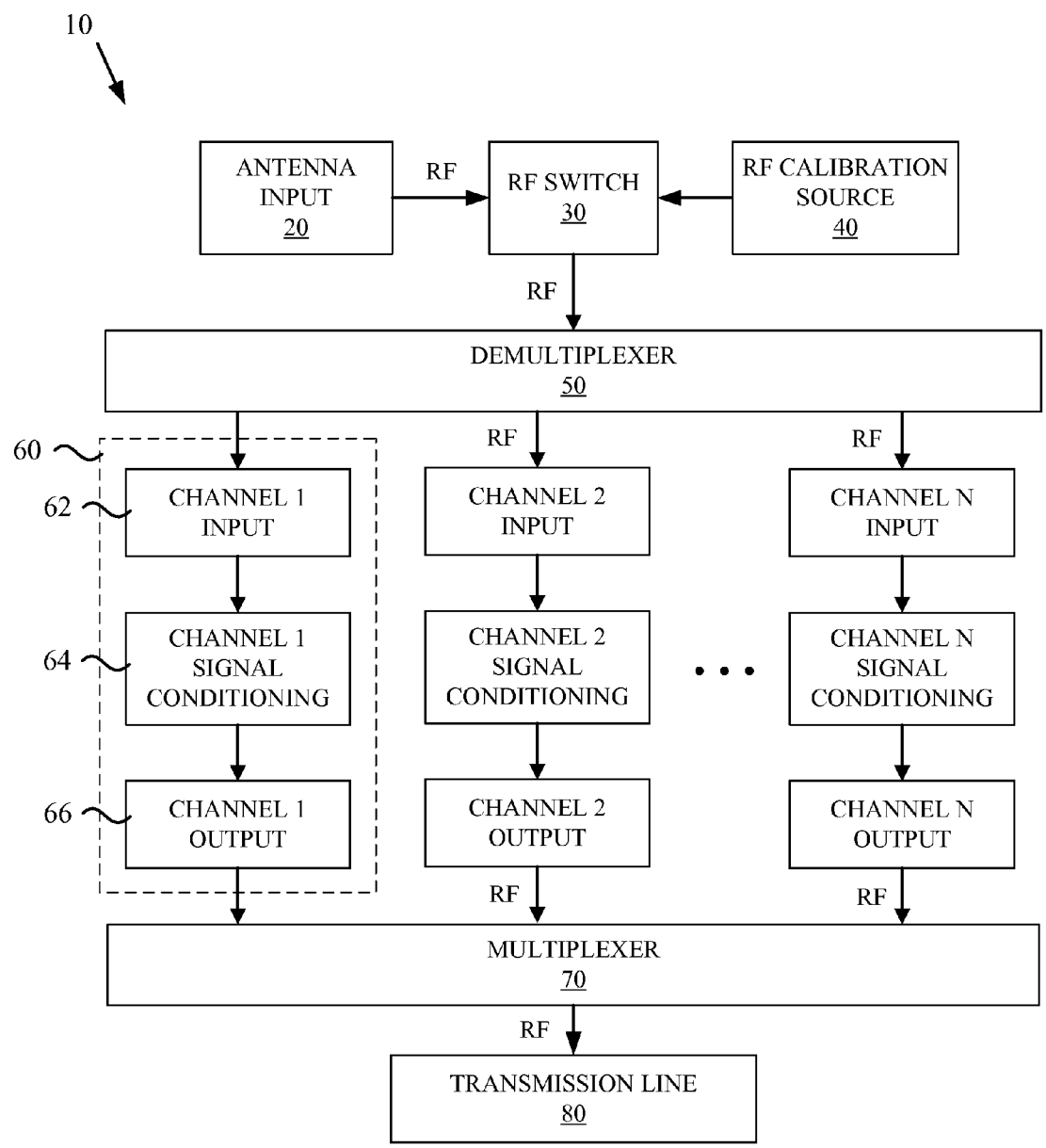
FIG. 1 is a block diagram illustrating an embodiment of the Radio Frequency Conditioning Unit.

The general purpose of the embodiments of the inventive subject matter is to pre-condition microwave RF signals picked up by a wide band receiving antenna before sending them over an RF transmission system to a distantly located receiver. The RF transmission system could possibly be a coaxial cable or a fiber optic link. The band of the receiving antenna could possibly be 1-18 GHz.

Another purpose is to amplify received RF signals before sending them over the RF transmission system, to overcome possible significant losses in the transmission system and to maintain good RF sensitivity and dynamic range. Another purpose is to prevent undesired strong RF signals from passing into the RF transmission system, which could be an RF over fiber optic link, while minimizing the amount of desired signals that are blocked from entering the RF transmission system. Another objective is to be able to receive weak RF signals from distant sources, while operating in an environment of strong interfering RF signals from co-site sources.

Undesired strong RF signals need to be prevented from passing into the RF transmission system due the possibility of their causing non-linearities in the components of the system and in the RF transmission system. For example, the RF transmission system could be an RF over fiber-optic link where the signal can possibly be transmitted over the fiber using an external modulator, which has a limited dynamic range. The system discussed herein also needs to provide protection from strong RF signals to its own components. Some components that may cause non-linearities include low-noise amplifiers, limiters, attenuators and electronic switches.

On a Navy ship, a receiving antenna will often pick up undesired strong signals from nearby co-site RF transmitters whose amplitudes are in excess of the previously described saturation limit of the invention and RF transmission system. In a receiving system, these strong signals can cause the non-linearities of components, such as those mentioned above, to generate additional undesired strong spurious signals that are harmonics and intermodulation products of the input signals. If the receiving system has a wide frequency bandwidth, these additional undesired strong signals can be located within the bandwidth, appearing as false positive detection events, and prevent the receiving system from seeing the desired signals that can be very weak.

A further purpose of the disclosed system is for it to operate as autonomously as possible while allowing for operator intervention. As an example, this autonomous operation may be realized by using a CPU and external controller.

A simple solution for eliminating impulsive interference is a fast self-blanking system. In the general case, the interference is band limited, for example radar. The problem with blanking the entire RF signal is that it eliminates all of the frequency content outside of the bandwidth of the RF interference. In a channelized system, each channel blanks independently of the others. The blanking in one channel has no impact on the other channels. Channelizing systems are used to remove second order and reduce third order intermodulation distortion products. The LNA, limiters (when not limiting), active switches and attenuators are not ideal linear devices; the deviations from the ideal linear response introduces intermodulation distortion and harmonics. If the channel is less than an octave in bandwidth all second order intermodulation distortion frequencies (sums or differences of any two frequencies in the band) will be outside of the bandwidth, but some third order intermodulation distortion products can be in band.

For any two frequencies $f_1$ and $f_2$, the sums $2f_1-f_2$ and $2f_2-f_1$ can be in the band. The magnitude of the third order intermodulation distortion waveforms $a_{112}$ and $a_{122}$ is proportional to the product of the magnitudes of each signal frequency $a_{112}=a_1^2 a_2$ and $a_{122}=a_2^2 a_1$ where $a_1$ and $a_2$ are the amplitudes of each frequency. A 1 dB increase in both signal amplitudes would increase the third order intermodulation distortion by 3 dB. If only the signal amplitude $a_1$ increases by 1 dB, then the $a_{112}$ third order intermodulation distortion would increase by 2 dB. The frequencies of third order intermodulation distortion products can also be the sums and differences of the three frequencies $f_1$, $f_2$ and $f_3$. Second order intermodulation products and some of the third order intermodulation products that are outside of the adjacent frequency range can be removed by dividing the frequency band into channels using multiplexers with separate circuitry for each channel.

One advantage of the system and method described herein is that they involve combining channelizing of sub-octave channels, which removes harmonics, second order intermodulation products, and some third order intermodulation products that fall out of band, with in-channel separate processing for each frequency channel. Another advantage includes, for each channel, allowing the choice between time domain and frequency domain processing.

Further, the system described herein includes the use of a CPU, which by monitoring the RF output of the system, can instigate the best mitigating action automatically to prevent overdriving the components of the systems or the RF transmission system. The CPU may be configured to control all aspects of the system. However, the user, via an external controller connected to the CPU, can implement desired corrections when necessary. The CPU can support built-in algorithms to handle various combinations of interfering signals, can monitor all input RF signals, and can compute information from the signals including duty cycle and pulse widths of RF interference sources.

FIG. 1 is a block diagram illustrating an embodiment 10 of the Radio Frequency Conditioning Unit. RF input from an antenna 20 is routed through an RF calibration system to the input port of demultiplexer 50. The RF calibration system may include an RF calibration source 40, which could possibly be a wideband RF noise source, and a device for connecting the signal from the RF calibration source into the input of the system. This device for connecting the RF calibration signal may be a mechanical RF switch 30. The RF calibration system provides for both calibration and built-in test of the system.

Demultiplexer 50 is configured to separate an input RF signal into a plurality of different signal components in respective contiguous frequency channels. Demultiplexer 50 then routes each RF signal component into one of N contiguous frequency channels 60, depending on its frequency. Each frequency channel 60 may have an octave or less bandwidth, meaning that the frequency of the top of the channel is less than or equal to twice the frequency of the bottom of the channel. For example, each frequency channel 60 may have a bandwidth of anywhere between 1-20 GHz.

Figure 2:
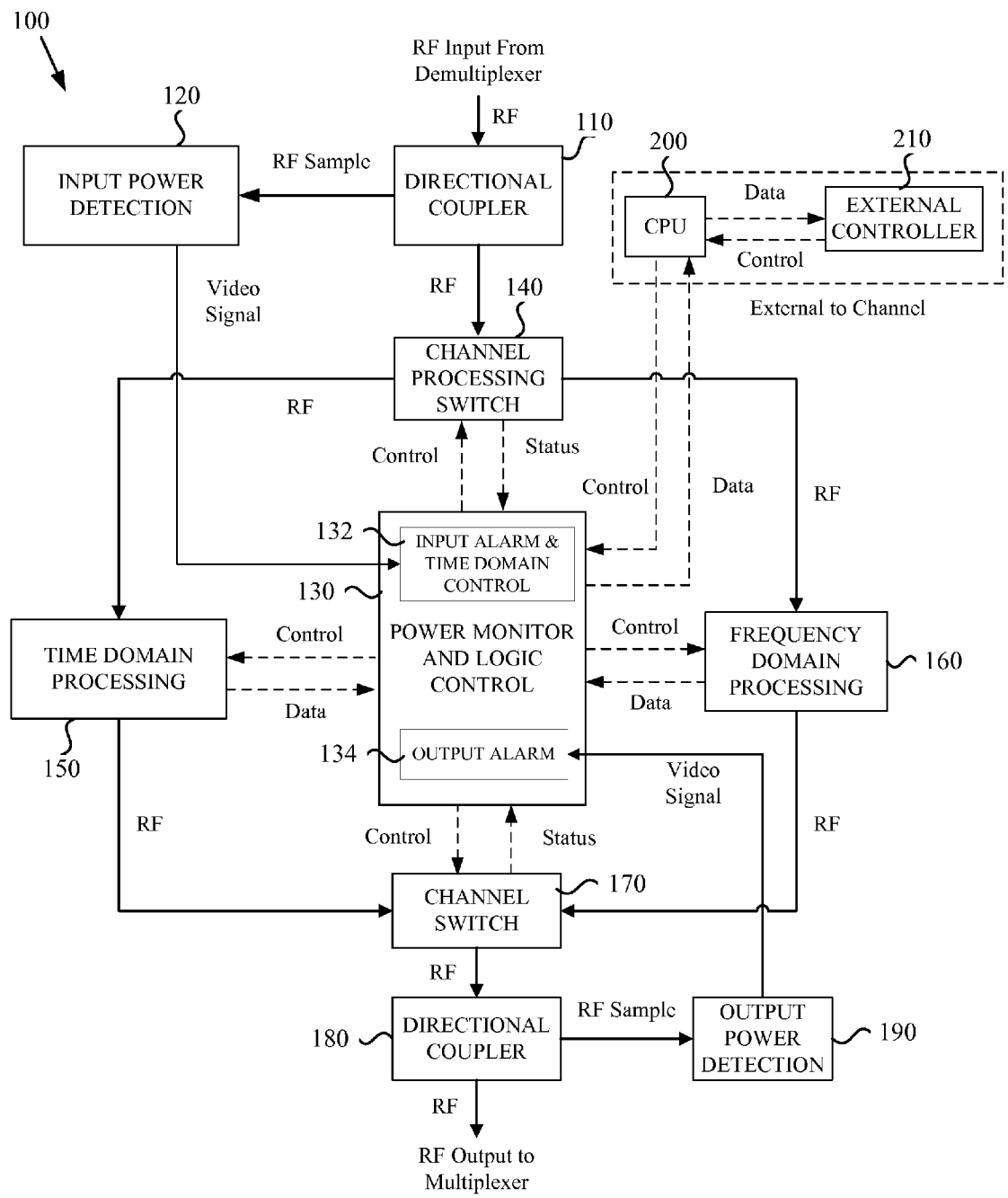
FIG. 2 is a block diagram illustrating an embodiment of a frequency channel within the Radio Frequency Conditioning Unit.

The RF signal components, or samples thereof, passing to each frequency channel 60 may first encounter input circuitry 62, such as input power detection circuitry 120 shown in FIG. 2, prior to encountering signal conditioning circuits 64. As an example, signal conditioning circuits 64 include time domain processing circuitry 150 and frequency domain processing circuitry 160, both shown in FIG. 2. The signal components, or samples thereof, may then encounter output circuitry 66, such as output power detection circuitry 190 shown in FIG. 2. The output from each of the N channels is then combined in the output multiplexer 70 and input into transmission line 80, which could be an RF over fiber optic link or a coaxial transmission line. Adjacent channel interference is minimized by maximizing the isolation between channels in the multiplexers.

In the design shown in FIG. 1, gaps in the frequency coverage at the crossover boundaries between adjacent frequency channels have been minimized by minimizing the attenuation of the multiplexers at the crossover frequencies and maximizing the slopes of the attenuation curves of the multiplexer outputs at the crossover points.

FIG. 2 is a block diagram illustrating an embodiment 100 of an individual frequency channel of the system, such as channel 60 shown in FIG. 1. Channel 100 may include a directional coupler 110 to receive the RF signal component input from demultiplexer 50. Directional coupler 110 directs a sample of the RF signal component to input power detection circuitry 120, while directing the remaining portion of the RF signal component to a channel processing switch 140. Input power detection circuitry 120 is configured to send a video signal output to input alarm and time domain control circuitry 132 contained within power monitor and logic control circuitry 130. Input alarm and time domain control circuitry 132 is configured to warn of excessive power levels and to control the time domain processing circuitry 150. Channel processing switch 140 then directs the RF signal component to either time domain processing circuitry 150 or frequency domain processing circuitry 160 based upon a control signal received from power monitor and logic control circuitry 130.

The output of time domain processing circuitry 150 or frequency domain processing circuitry 160 is then routed to a channel switch 170. Channel switch 170, which is controlled by power monitor and logic control circuitry 130, allows RF signal components from either the time domain circuitry 150 or the frequency domain processing circuitry 160 to be routed to directional coupler 180. Channel switches 140 and 170 operate in tandem with both switches connecting to the time domain or frequency domain circuitry simultaneously. Directional coupler 180 routes a sample of the RF signal component to output power detection circuitry 190 and routes the remaining portion of the RF signal component to multiplexer 70 shown in FIG. 1. Similarly to input power detection circuitry 120, output power detection circuitry 190 sends an output video signal to output alarm circuitry 134 contained within power monitor and logic control circuitry 130. Output alarm circuitry 134 is configured to warn of excessive power levels.

Power monitor and logic control circuitry 130 also has a Central Processor Unit (CPU) 200 operatively connected thereto. In some embodiments, CPU 200 is connected to the power monitor and logic control circuitry for all of the frequency channels 60 of system 10. In such embodiments, CPU 200 is located external from each individual channel 60. In other embodiments, there may be a separate CPU 200 for each individual frequency channel 60. CPU 200 sends control commands to all of the power monitor and logic control circuitry 130 and gathers data from all of them. CPU 200 in turn interfaces with an external controller 210 which, for example, could be a computer. External controller 210 may have the appropriate software stored therein to control CPU 200.

CPU 200 takes in and utilizes the data from the each power monitor and logic control circuitry representing the statuses and alarm messages from all of the individual frequency channels 60. CPU 200 can then utilize this data to automatically adjust circuit parameters of time domain processing circuitry 150 and frequency domain processing circuitry 160. These parameters may include the voltages from the precision adjustable voltage dividers (see FIG. 5), the attenuators before and after the low-noise amplifiers (see FIG. 3), and the settings of channel processing switch 140 and channel switch 170. It is beneficial for CPU 200 to make these parameter adjustments, due to the rapid changes of the interference signals and the number of parameters that would have to be otherwise manually adjusted.

In some embodiments, time domain processing circuitry 150 is the default setting. If the incoming excessively high amplitude RF signal has a high duty cycle or is continuous wavelength, the power monitor and logic control circuitry 130 can automatically switch to frequency domain processing circuitry 160 (CPU 200 or external controller 210 may contain algorithms stored therein for autonomous RF management). Power monitor and logic control circuitry 130 will then automatically try switching in all of its frequency filters sequentially, then in combinations. If this fails to reduce or eliminate the excessive amplitude signal, its next step will be to switch attenuation into the entire channel in increasing amounts in attenuators 422 and 426 (see FIG. 4) until the excessive amplitude signal is reduced to an acceptable level. Such procedures may be carried out via algorithms. However, CPU 200 will have the ability to send information to, and, if necessary, implement requests from a human operator via the interface provided by external controller 210.

As shown in FIG. 2, time domain processing circuitry 150 and frequency domain processing circuitry 160 are in parallel with channel processing switch 140 and channel switch 170. In other embodiments, time domain processing circuitry 150 and frequency domain processing circuitry 160 are located in series. However, while this would have the advantage of reducing the number of parts, it would also have reduced reliability because this configuration would lose the redundancy feature of the parallel design shown in FIG. 2.

Figure 3:
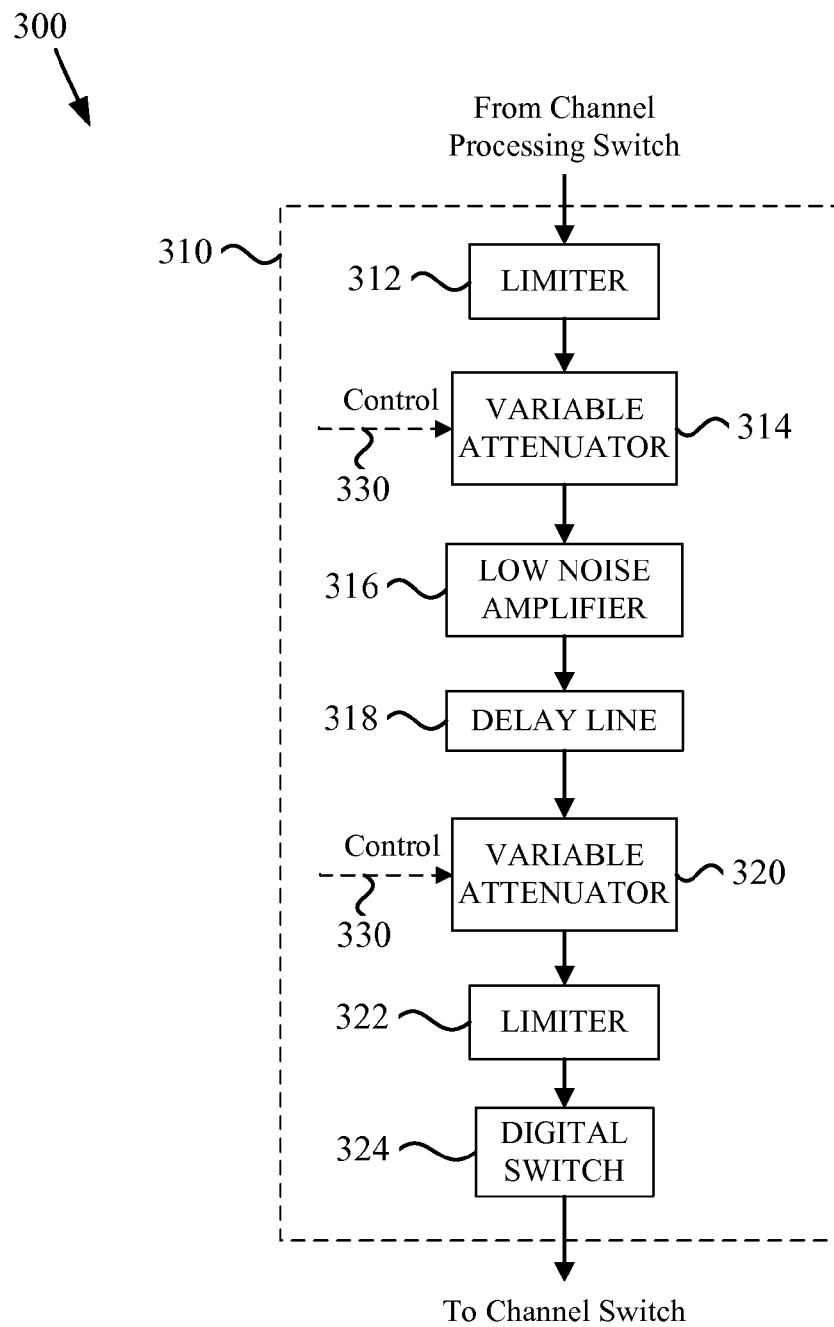
FIG. 3 is a block diagram illustrating an embodiment of time domain processing circuitry for use within the Radio Frequency Conditioning Unit.

FIG. 3 is a block diagram 300 illustrating an embodiment of time domain processing circuitry 310. In the embodiment shown, time domain processing circuitry 310 comprises a first limiter 312 connected to a first variable attenuator 314, a low-noise amplifier 316 connected to first variable attenuator 314 and a delay line 318, a second variable attenuator 320 connected to delay line 318 and a second limiter 322, and a time domain processing circuitry switch 324 connected to second limiter 322. Attenuators 314 and 320 are configured to be controllable via a control signal 330, which may be received from an external controller such as power monitor and logic control circuitry 130 shown in FIG. 2. Time domain processing circuitry switch 324 is connected to channel switch 170 shown in FIG. 2. Switch 324 is controlled by the stretched TTL control signal from the NOR gate 520 (shown in FIG. 5).

As an example, delay line 318 is a coil of coaxial cable of a particular length to provide a specific signal delay time. For example, the coaxial delay line provides a delay of about 30 nSec for all RF signals passing through it. The purpose for the delay line can be seen in FIGS. 8A and 8B. These figures show graphs illustrating successive delays for the successive stages from the RF input to the log video detector 616 (shown in FIG. 6) to comparator 512 (shown in FIG. 5) to pulse stretcher 518 to NOR gate 520 to high speed digital switch 324. Delay line 318 helps to ensure that all of the steps have been completed and that the switch 324 is completely open before the excessive RF energy reaches the input to switch 324.

The amount of delay for the RF energy in time domain processing circuitry 310 depends on the total delays and rise times in all of the components in input power detection circuitry 120 and input alarm and time domain control circuitry 132 located on power monitor and logic control circuitry 130, and high-speed switch 324. The purpose of the pulse stretching is to ensure that all of RF energy has finished passing through delay line 318 before the switch 324 is closed. The sum total of the RF pulse fall times and the total delays in the input power detection circuitry 120, the input alarm and time domain control circuitry 132 located on power monitor and logic control circuitry 130, and high-speed switch 324 determines the pulse stretcher length. For a generic system, variations in component specifications must be factored into the design. The design must also take into account all delays in both signal paths to optimize the performance. If the RF pulse has a very long rise or fall time a portion of the pulse could be outside the blanking window. This design switches out only the parts of pulses that are above the threshold settings, which could allow the lower amplitude beginning and end of the pulse to pass through the switch. This will still provide the RF transmission system protection from the high amplitude part of the interference pulse.

Locating low-noise amplifier 316 ahead of delay line 318 and switch 324 significantly improves the noise figure of the frequency channel. Although low-noise amplifier 316 is not protected from excessive-amplitude pulses at this location and could generate distortion products and frequency spurs along with the amplified pulses, these will be blocked by switch 324 and limiter 322. In one embodiment, although the worst-case isolation of switch 324 is only 60 dB, limiter 322 at its input limits the maximum input power to the switch to 18 dBm, so that the maximum output from the switch would be −42 dBm, resulting in a total reduction of 82 dB, for an input of +40 dBm.

Figure 4:
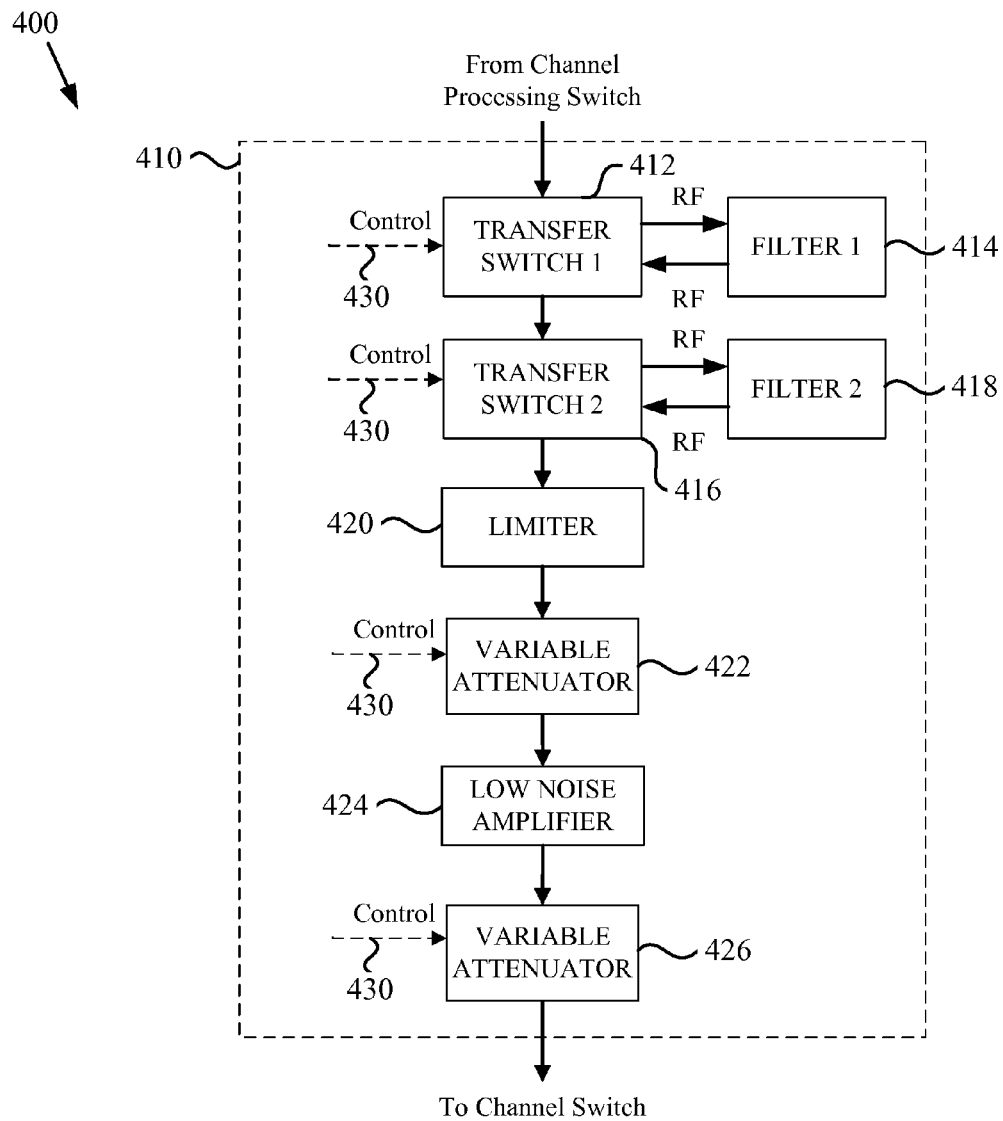
FIG. 4 is a block diagram illustrating an embodiment of frequency domain processing circuitry for use within the Radio Frequency Conditioning Unit.

FIG. 4 is a block diagram 400 illustrating an embodiment of frequency domain processing circuitry 410. Frequency domain processing circuitry 410 utilizes a second approach for removing RF signals with excessive amplitudes from the output of an individual frequency channel. Instead of switching out an entire frequency channel for a short time period, frequency domain processing circuitry 410 operates by inserting, for example, band-blocking filters or narrow band-pass filters at specific frequencies in the channel. Frequency domain processing circuitry 410 is used when the incoming excessively high amplitude RF signals have high duty cycles or are continuous wave. Frequency domain processing circuitry 410 is also used when it is desirable to have no time gaps in the received signal.

As shown, frequency domain processing circuitry 410 includes a first transfer switch 412 connected to a first filter 414 and channel processing switch 140 (shown in FIG. 2). Circuitry 410 also includes a second transfer switch 416 connected to first transfer switch 412 and a second filter 418. A limiter 420 is connected to second transfer switch 416 and a first variable attenuator 422. A low-noise amplifier 424 is connected to first variable attenuator 422 and a second variable attenuator 426, the output of which is connected to channel switch 170 (shown in FIG. 2). In some embodiments, switches 412 and 416, as well as attenuators 422 and 426, may be controlled by a control signal 430, which may be received from an external controller such as power monitor and logic control circuitry 130 shown in FIG. 2.

First transfer switch 412 and second transfer switch 416 insert band blocking filters 414 and 418, respectively, into the RF path. The rejection bands for filters 414 and 418 can be chosen in advance to match the frequencies of expected interference sources. For example, one possible configuration is to have two filters to reject the lower and upper halves of the frequency range of the channel. The filters could also be designed as band pass filters to cover narrower segments of the channel. The filters can be inserted separately, or any combination of filters can be inserted if multiple frequencies need to be blocked. Additionally, if there are no filters available for blocking an incoming RF signal with excessive amplitude, or if existing filters do not provide enough attenuation, the entire channel can be attenuated using variable attenuators 422 and 426. Attenuator 422 is used because filters typically have maximum attenuation values of 60 dB, which for very strong signals may not be adequate to keep low-noise amplifier 424 from being overdriven. Attenuator 426 is used because some strong signals need to be reduced in amplitude to keep from overdriving the RF over fiber optic link.

Figure 5:
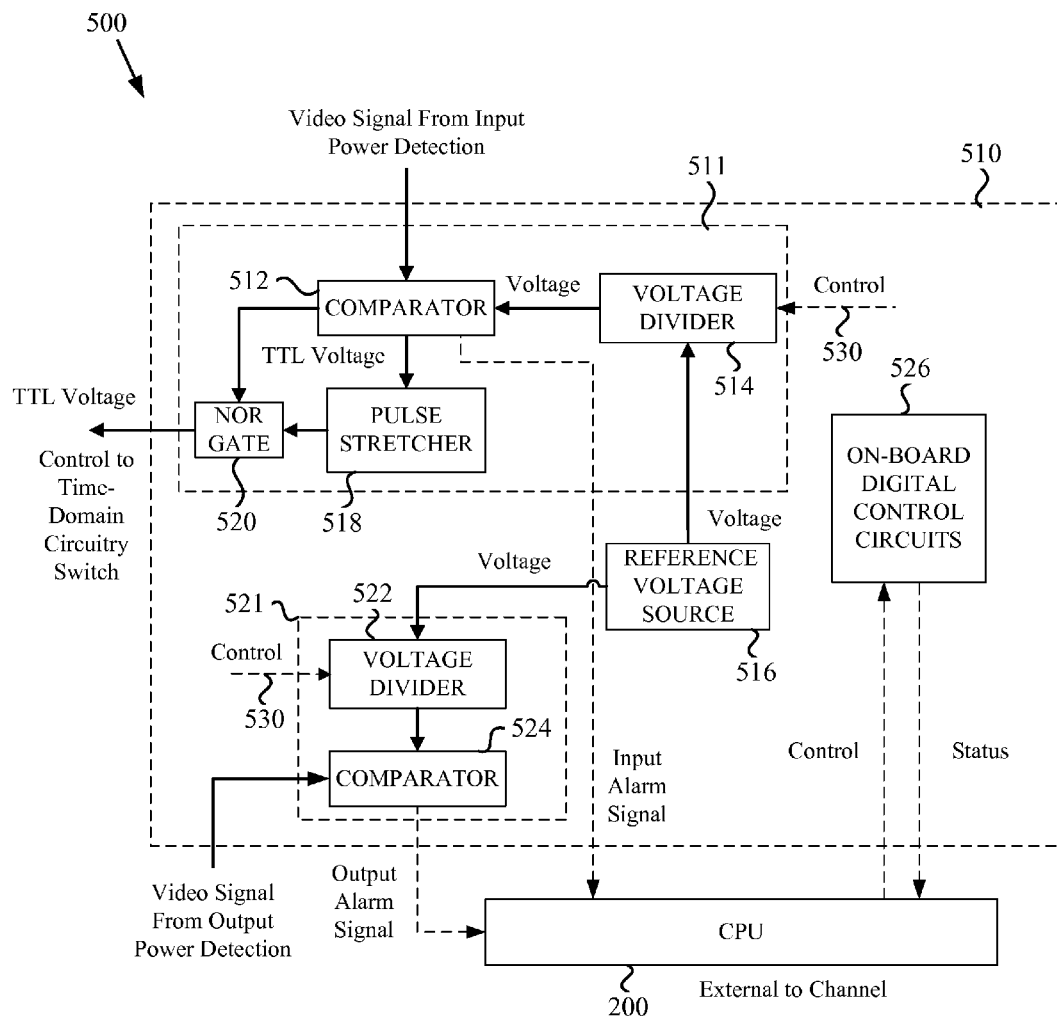
FIG. 5 is a block diagram illustrating an embodiment of power monitor and logic circuitry for use within the Radio Frequency Conditioning Unit.

FIG. 5 is a block diagram 500 illustrating an embodiment of power monitor and logic control circuitry 510 for use within the Radio Frequency Conditioning Unit. Circuitry 510 may represent the detailed version of circuitry 130 shown in FIG. 2. The power monitor and logic circuitry 510 contains all of the electronic circuitry for monitoring and controlling all of the various components on the individual frequency channel. Each frequency channel has its own power monitor and logic circuitry 510. In one embodiment, the power monitor and logic board circuitry 510 comprises input alarm and time domain control circuitry 511, which includes a first comparator 512 connected to a first precision voltage divider 514, which is connected to a voltage reference source 516, and a pulse stretcher 518. Circuitry 511 also includes a NOR logic gate 520 which is connected to the first comparator 512 and pulse stretcher 518. Voltage reference source 516 is also connected to output alarm circuitry 521, which includes a second precision voltage divider 522 and a second comparator 524. In some embodiments, voltage dividers 514 and 522 may be controlled by a control signal 530, which may be received from an external controller such as power monitor and logic control circuitry 130 or CPU 200 shown in FIG. 2.

Comparators 512 and 524, which may be high-speed comparators, are configured to send alarm signals to CPU 200, which is the same CPU shown in FIG. 2. The alarm signals are generated if the input video signal into the respective comparator exceeds the voltage received from voltage dividers 514 or 522, which receive an initial voltage from voltage reference source 516. CPU 200 may then transmit alarm signal information to an external controller, such as a computer, to notify a human operator of the system. CPU 200 is also configured to send control signals to, and receive status of the individual frequency channel from, on-board digital control circuitry 526 contained within power monitor and logic board circuitry 510. Digital control circuitry 526 may be configured to control channel processing switch 140 and channel switch 170 shown in FIG. 2, transfer switches 412 and 416 shown in FIG. 4, and variable attenuators 314, 320, 422, and 426 shown in FIGS. 3 and 4.

FIG. 6 is a block diagram 600 illustrating an embodiment of input power detection circuitry 610. As shown, input power detection circuitry 610 includes a low-noise amplifier 612 and a log video detector 616 both connected to a limiter 614. The input into amplifier 612 is an RF sample of the signal component received from directional coupler 110 (shown in FIG. 2), while the output of log video detector 616 is a video signal that is sent to power monitor and logic control circuitry 130, more particularly input power detection circuitry 132, shown in FIG. 2.

In one embodiment, directional coupler 110 splits off a −10 dB portion of the incoming RF signal and feeds it through low-noise amplifier 612 and limiter 614, into log video detector 616, which outputs a voltage that is proportional to the logarithm of the power of the RF signal it receives. The output voltage of log video detector 616 is sent to comparator 512 (shown in FIG. 5). If the output voltage of log video detector 616 is larger than the reference voltage from voltage reference source 516 and voltage divider 514, the TTL logic output from comparator 512 will go high. If the output voltage is lower than the reference voltage, the logic output from comparator 512 will go low. The output of comparator 512 is then routed through pulse stretcher 518 and NOR gate 520, the resulting signal being sent to high speed digital switch 324. If a high signal is received, digital switch 324 is opened to prevent the excessive amplitude signal from being routed to multiplexer 70 (shown in FIG. 1). If the output is low, digital switch 324 remains closed so that the RF signal can be routed to multiplexer 70.

FIG. 7 is a block diagram 700 illustrating an embodiment of output power detection circuitry 710. As shown, output power detection circuitry 710 includes a directional coupler 712, which receives input from channel processing switch 140 (shown in FIG. 2), connected to a log video detector 714, whose output is a video signal that is sent to power monitor and logic control circuitry 130, more particularly output power detection circuitry 134, shown in FIG. 2. As stated above, output power detection circuitry detects and warns of excessive power levels.

In one embodiment, directional coupler 712 (which is the same as directional coupler 180) splits off a −10 dB portion of the output of the RF signal and feeds it into a log video detector 714, which outputs a voltage that is proportional to the logarithm of the power of the RF signal it receives. The output voltage of log video detector 714 is sent to comparator 524 (shown in FIG. 5). If the output voltage of log video detector 714 is larger than the reference voltage from voltage reference source 516 and voltage divider 522, the TTL logic output from the comparator will go high. The output of comparator 524 is an alarm signal sent to CPU 200, which in turn can make adjustments in the parameters of the components using a pre-programmed algorithm, to reduce the output power to an acceptable level.

Figure 8A:
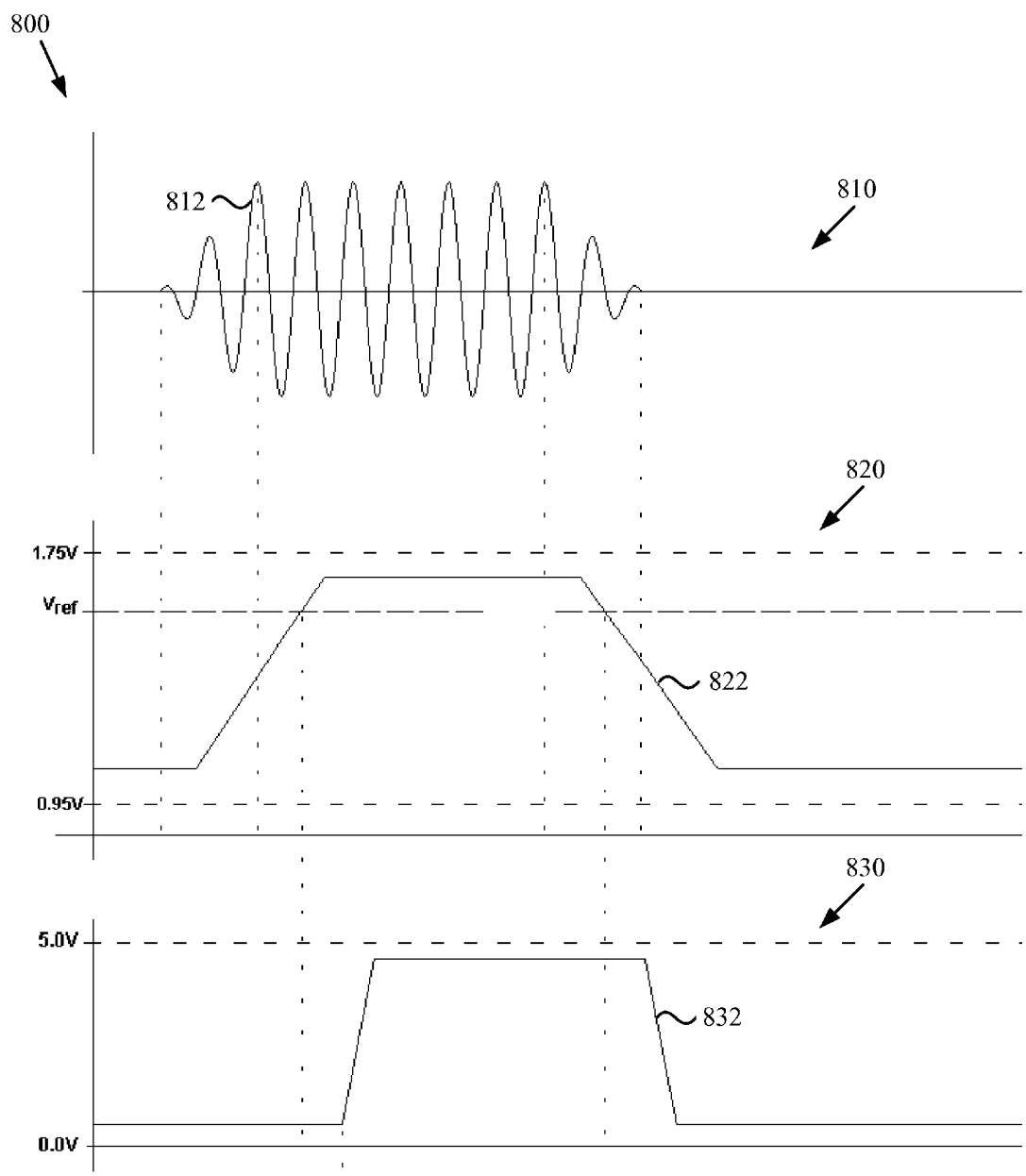
FIGS. 8A and 8B show graphs of the signals versus time at different points in an embodiment of the time domain processing circuitry used within the Radio Frequency Conditioning Unit.
Figure 8B:
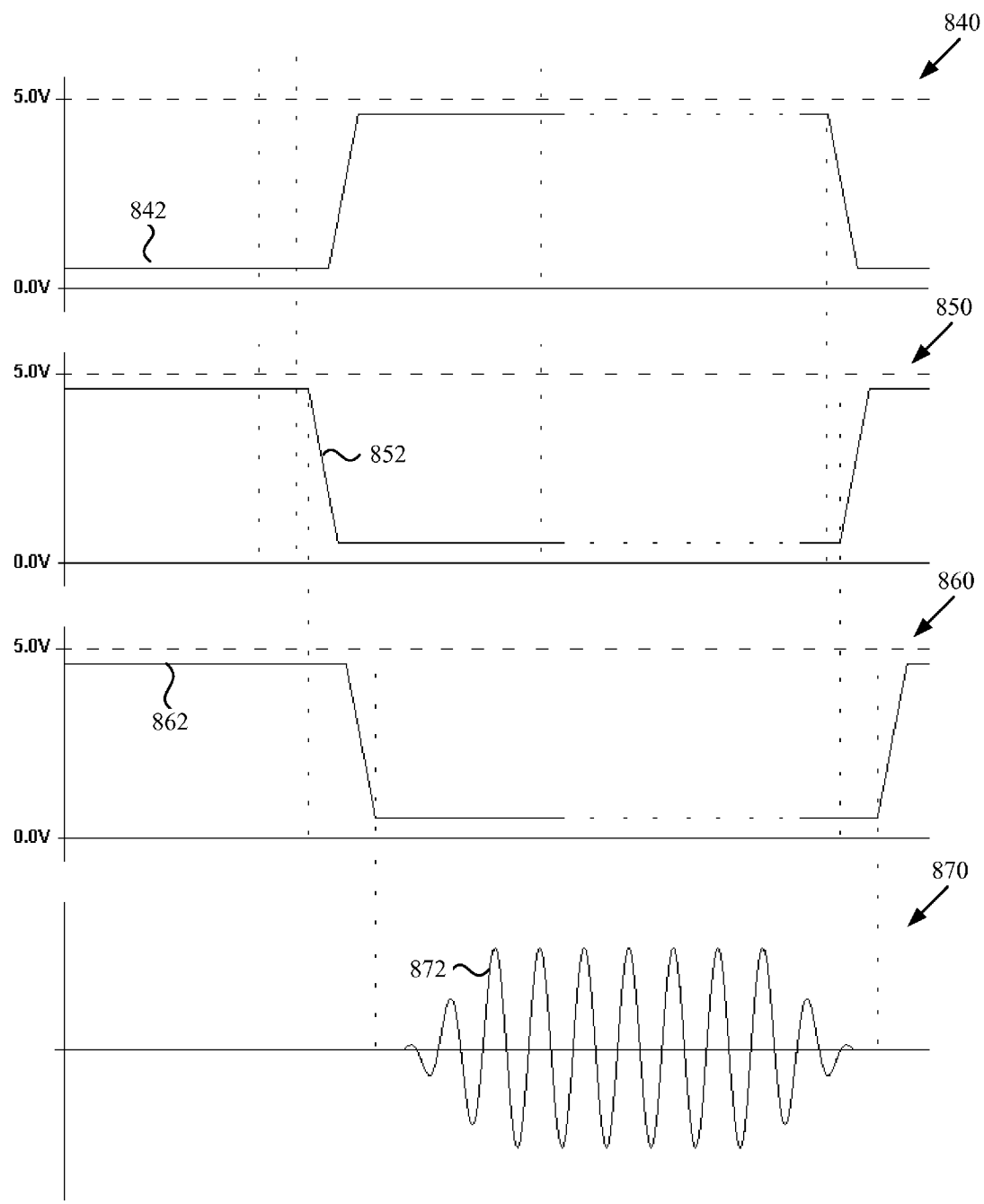

FIGS. 8A and 8B show various graphs 800 of the signals versus time at different points in an embodiment of the time domain processing circuitry used within the Radio Frequency Conditioning Unit. FIGS. 8A and 8B are illustrative diagrams and are not intended to be exact representation of the signals. Referring to FIG. 8A, top graph 810 illustrates an RF pulse 812 coming into input power detection circuitry 120 and time domain processing circuitry 150.

Graph 820 illustrates the output signal 822 of log video detector 616 (shown in FIG. 6). This output signal could typically have a 3 nSec delay time and a 2 nSec rise time. As discussed above with respect to FIG. 6, the output of log video detector 616 feeds into comparator 512. The other input to comparator 512 is the threshold reference voltage from an adjustable precision voltage source 516 and voltage divider 514. Graph 820 also shows the reference threshold voltage $V_{ref}$. When the output of log video detector 616 rises above $V_{ref}$, comparator 512 will output a high TTL logic signal, shown as signal 832 of graph 830. As an example, the TTL logic signal from comparator 512 could typically have a delay time of 2-4.5 nSec and a rise time of 1-1.5 nSec. An alarm signal from comparator 512 is sent to CPU 200 connected to the power monitor and logic control circuitry 510.

Referring to FIG. 8B, the TTL signal of graph 830 then also goes to pulse stretcher 518, which produces a stretched TTL pulse 842, as shown in graph 840. The reason for stretching the TTL logic signal was discussed above. The output of comparator 512 and pulse stretcher 518 are fed into the NOR gate 520. If either one has a high TTL logic value, the NOR gate will put out a low TTL logic value. The reason for using the NOR gate is that the pulse stretcher could have some delay in the leading edge of its response. Using the NOR gate to combine the comparator pulse 832 with stretched pulse 842 minimizes the delay in the inverted pulse 852 of graph 850.

When the TTL signal 852 from NOR gate 520 goes low, it will open high-speed digital switch 324 that controls the output signal to channel switch 170, as shown by signal 862 in graph 860. Graph 870 shows that the time period when the delayed RF signal 872 is present at the input of the high speed switch 324, it will be entirely inside the time period when switch 324 is open, so that all traces of the high amplitude RF pulse will be eliminated from the output signal of high-speed digital switch 324.

Figure 9:
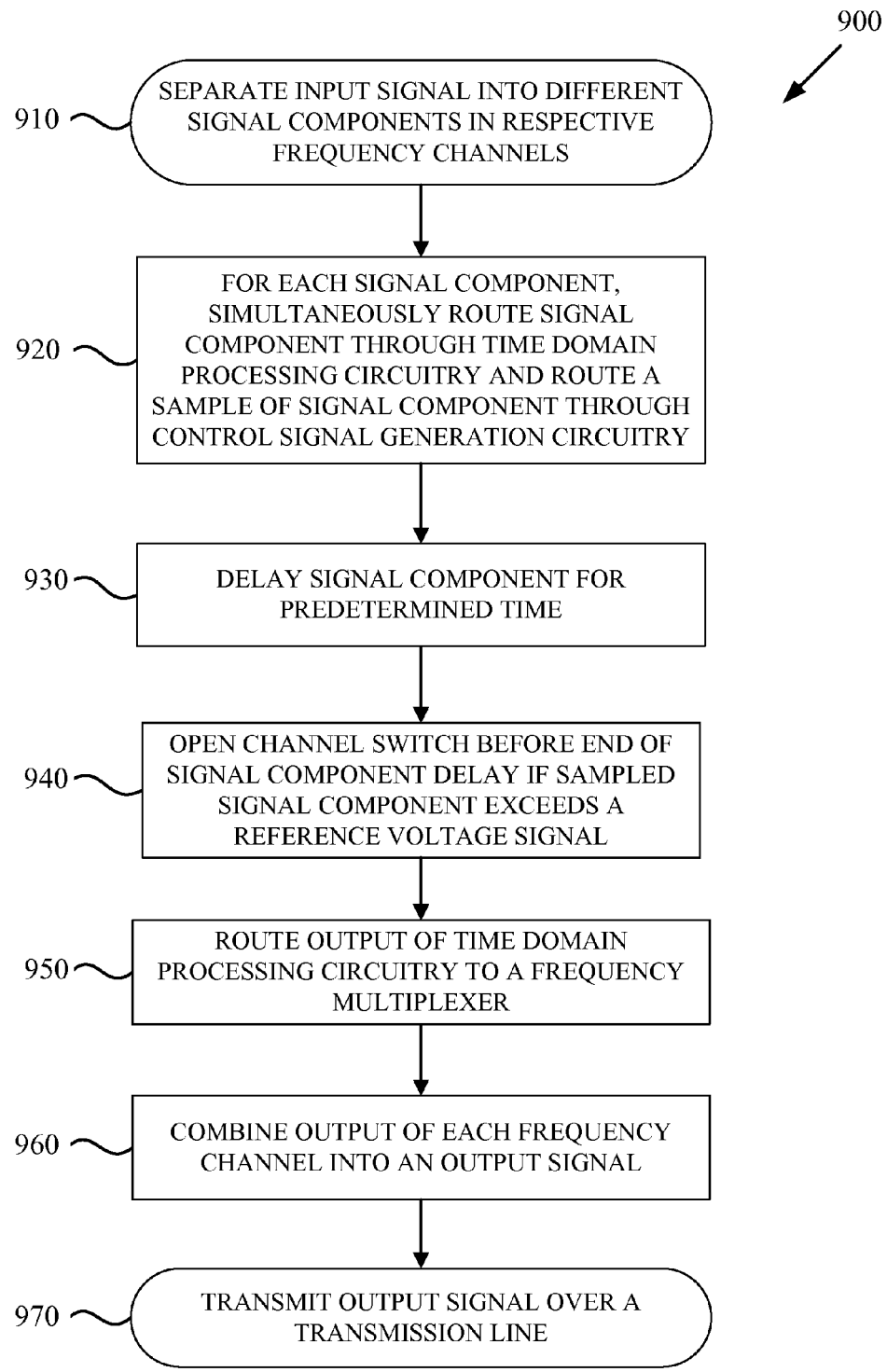
FIG. 9 shows a flowchart of an embodiment of a method for use with the system in accordance with the Radio Frequency Conditioning Unit.
Figure 10:
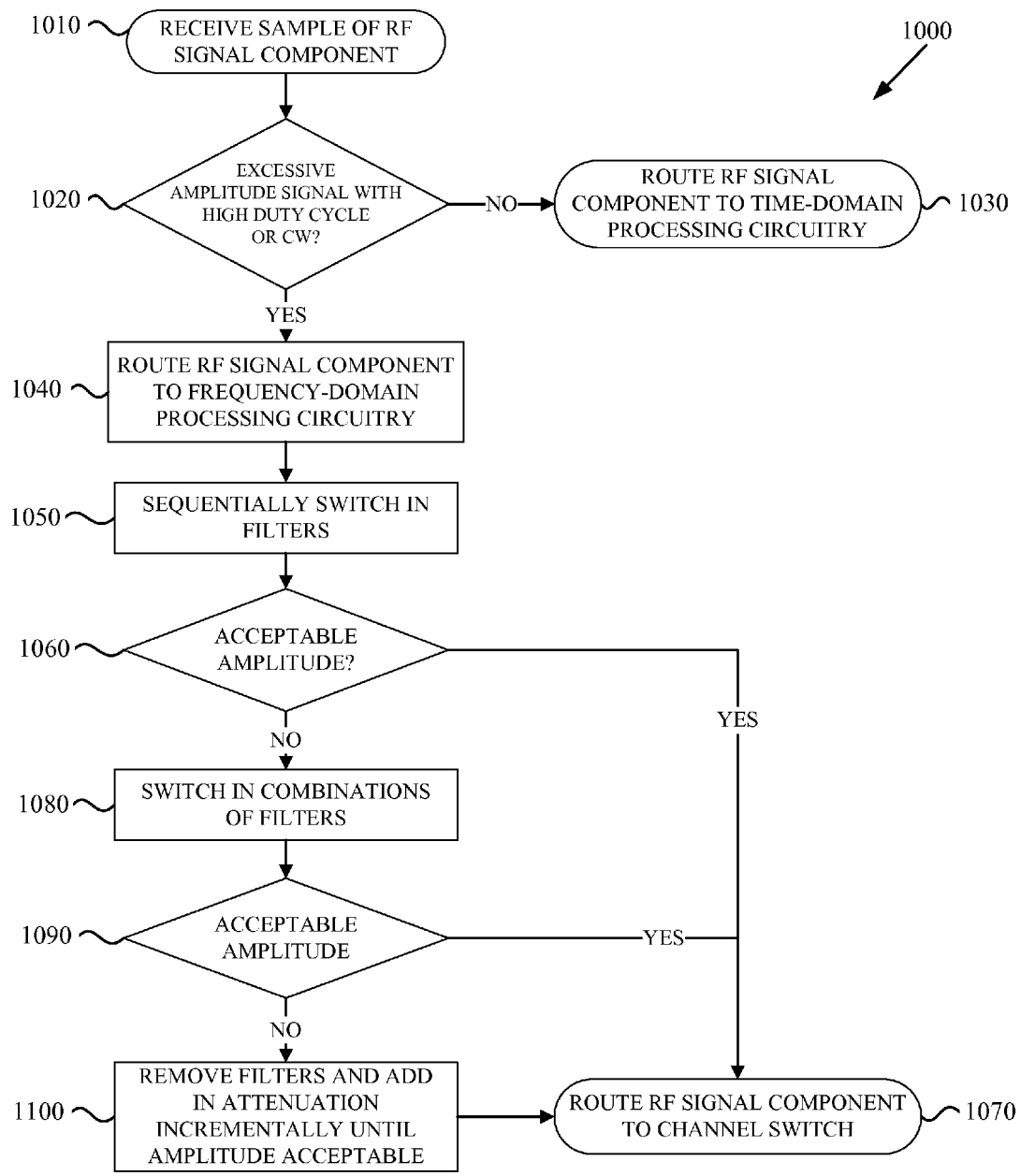
FIG. 10 shows a flowchart of another embodiment of a method for use with the system in accordance with the Radio Frequency Conditioning Unit.

FIGS. 9 and 10 show flowcharts of embodiments of methods 900 and 1000 for use with the system in accordance with the Radio Frequency Conditioning Unit. As an example, methods 900 and 1000 may be performed by system 10, including the components detailed in FIGS. 1-7, detailed herein. Correspondingly, methods 900 and 1000 will be discussed with reference to system 10 and its respective components. Further, while FIG. 9 shows one embodiment of method 900 to include steps 910-970 and FIG. 10 shows one embodiment of method 1000 to include steps 1010-1100, other embodiments of methods 900 and 1000 may contain fewer steps. Further, while in some embodiments the steps of methods 900 and 1000 may be performed as shown in FIGS. 9 and 10, in other embodiments the steps may be performed in a different order, or certain steps may occur simultaneously with one or more other steps.

Referring now to FIG. 9, method 900 may begin at step 910, which involves separating a received signal into a plurality of different signal components in respective contiguous frequency channels. As an example, step 910 may be performed by demultiplexer 50 using an input signal received from antenna input 20 and directed to demultiplexer 50 using RF switch 30. The input signal would be separated into frequency channels 1 to N 60.

Step 920 then involves, for each signal component, simultaneously routing the signal component through time domain processing circuitry 150 and routing a sample of the signal component through control signal generation circuitry. Step 920 may be performed by directional coupler 110 routing the RF signal component through channel processing switch 140 to time domain processing circuitry 150 and by routing a sample of the RF signal component to input power detection circuitry 120 (shown as circuitry 610 in FIG. 6). As part of step 920, the sampled RF signal component may be converted to a video signal output by log video detector 616, with such output being provided to power monitor and logic control circuitry 130 (shown as circuitry 510 in FIG. 5). As used herein, the control signal generation circuitry may include a combination of the input power detection circuitry 610 and power monitor and logic control circuitry 510.

Step 930 involves delaying, via time domain processing circuitry 310, particularly delay line 318, the signal component for a predetermined time. The delay allows the control signal generation circuitry (e.g. input power detection circuitry 610 and input alarm and time domain control circuitry 511 included within power monitor and logic control circuitry 510) to generate a control signal to either keep high speed digital switch 324 closed if the reference voltage signal from voltage divider 514 and reference voltage source 516 is not exceeded, or to open high-speed digital switch 324 if any portion of the signal component exceeds the reference voltage signal.

Step 940 then involves, if any portion of the sampled signal component exceeds a reference voltage signal, opening, via a control signal generated by the control signal generation circuitry, a high-speed digital switch 324 connected to the control signal generation circuitry and time domain processing circuitry 310. Step 940 may include comparing, using comparator 512, the received signal from input power detection circuitry 610 to a reference voltage signal from reference voltage source 516 and voltage divider 514, and determining that the sampled signal exceeds the reference voltage signal. Then, as discussed above with respect to FIGS. 8A and 8B, generating a control signal using pulse stretcher 518 and NOR gate 520 to open switch 324.

Step 950 then involves, when high-speed digital switch 324 is closed, routing the output of time domain processing circuitry 310 through channel switch 170 to frequency channel multiplexer 70. Step 960 then involves combining, using multiplexer 70, the output of each frequency channel 60 into an output signal. Step 970 then involves transmitting the output signal over a transmission line, such as transmission line 80.

Referring now to FIG. 10, method 1000 may begin at step 1010, which involves receiving a sample of an RF signal component. As an example, the sample of an RF signal component may be received by input power detection circuitry 120, originating from directional coupler 110. Step 1020 may then involve determining whether the sample has excessive amplitude and either has a high duty cycle or is a continuous wavelength signal. In one implementation, the determination of step 1020 is made by power monitor and logic control circuitry 130 using algorithms that may be stored within external controller 210.

If an excessive amplitude does not exist, or the excessive amplitude signal is not continuous wavelength or does not have a high duty cycle, step 1030 involves routing, such as via channel processing switch 140, the received RF signal component to time-domain processing circuitry 150. The routing may occur based upon a control signal received by channel processing switch 140 from power monitor and logic control circuitry 130. The processing of the RF signal component may then proceed as set forth in step 920 of method 900.

If the determination at step 1020 is that the sample contains excessive amplitude and a high duty cycle or continuous wavelength, step 1040 involves routing, such as via channel processing switch 140 from a control signal received from power monitor and logic control circuitry 130, the RF signal component to frequency domain processing circuitry 160. Step 1050 may then involve sequentially switching in one or more filters, such as filters 414 and 418, to attempt to reduce or eliminate the excessive amplitude signal, checking to see if the amplitude is acceptable after the addition of each filter. For example, transfer switch 1 412 may, in response to control signal 430, be used to apply filter 1 414 to the RF signal component. The amplitude would then be checked, and if this fails to reduce or eliminate the excessive amplitude signal, transfer switch 1 412 may be used to turn off filter 1 414 and transfer switch 2 416 may be used to apply filter 2 418 to the RF signal component.

Step 1060 may then involve a determination as to whether the amplitude level of the filtered RF signal component is acceptable. In one implementation, the determination of step 1060 is made by power monitor and logic control circuitry 130 using algorithms that may be stored within external controller 210. If the amplitude level is acceptable, step 1070 involves outputting the RF signal component from frequency domain processing circuitry 160 to channel switch 170. As part of this process, the RF signal component may proceed through other frequency domain processing circuitry 160 components such as limiter 420 and low noise amplifier 424.

If the amplitude level is not acceptable, step 1080 involves switching in one or more combinations of filter 1 414 and filter 2 418, such as both filter 1 414 and filter 2 418. Then, step 1090 involves another determination as to whether the amplitude level is acceptable. If so, method 1000 proceeds to step 1070 to route the RF signal component to channel switch 170. If not, method 1000 may proceed to step 1100, which involves removing the filters and adding in attenuation incrementally until the RF signal component has an acceptable amplitude. Step 1100 may involve applying, via control signal 430, variable attenuators 422 and/or 426 and adjusting them until the RF signal component has acceptable amplitude. Then, method 1000 may proceed to step 1070 to route the RF signal component to channel switch 170.

It should be noted that while many of the procedures described above with respect to method 1000 may be carried out via algorithms, CPU 200 may be configured with the ability to send information to, and, if necessary, implement requests from a human operator via the interface provided by external controller 210.

Some or all of the steps of methods 900 and 1000 may be stored on a computer-readable storage medium, such as a non-transitory computer-readable storage medium, wherein the steps are represented by computer-readable programming code. The steps of methods 900 and 1000 may also be computer-implemented using a programmable device, such as a computer-based system. Methods 900 and 1000 may comprise instructions that may be stored within a processor, such as CPU 200 or external controller 210 shown in FIG. 2, or may be loaded into a computer-based system, such that the processor or computer-based system then may execute the steps of methods 900 and 1000. Methods 900 and 1000 may be implemented using various programming languages, such as "Java", "C" or "C++".

Various storage media, such as magnetic computer disks, optical disks, and electronic memories, as well as non-transitory computer readable storage media and computer program products, can be prepared that can contain information that can direct a device, such as a micro-controller or processor, to implement methods 900 and 1000. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Radio Frequency Conditioning Unit are possible in light of the above description. Within the scope of the appended claims, the Radio Frequency Conditioning Unit may be practiced otherwise than as specifically described. The scope of the claims is not limited to the implementations and embodiments disclosed herein, but extends to other implementations and embodiments as may be contemplated by those having ordinary skill in the art.

We claim:

1. A system comprising:
    a frequency demultiplexer configured to separate an input signal into a plurality of different signal components in respective contiguous frequency channels, each frequency channel comprising an octave or less of bandwidth;
    a plurality of signal component conditioning circuits operatively connected to the frequency demultiplexer, each signal component conditioning circuit corresponding to a separate frequency channel and comprising control signal generation circuitry and a channel switch connected to the output of both time domain processing circuitry and frequency domain processing circuitry, the control signal generation circuitry configured to generate a control signal to open a digital switch contained within the time domain processing circuitry and connected to the channel switch if any sampled portion of the signal component exceeds a reference voltage signal, the time domain processing circuitry configured to delay the signal component for a predetermined time to prevent the portion of the signal component exceeding the reference voltage signal from passing to the digital switch until the digital switch is open; and
    a frequency multiplexer, operatively connected to the channel switch of each of the plurality of signal component conditioning circuits, configured to combine the output of each of the signal component conditioning circuits into an output signal.

2. The system of claim 1, wherein the time domain processing circuitry comprises:
    a first limiter connected to a first variable attenuator;
    an amplifier connected to the first variable attenuator and a delay line;
    a second variable attenuator connected to the delay line and a second limiter; and
    the digital switch, wherein the digital switch is connected to the second limiter.

3. The system of claim 1, wherein the control signal generation circuitry comprises input power detection circuitry and power monitor and logic control circuitry.

4. The system of claim 3, wherein the input power detection circuitry comprises an amplifier and a log video detector both connected to a limiter.

5. The system of claim 3, wherein the power monitor and logic control circuitry comprises:
    a first comparator connected to a first voltage divider and a pulse stretcher;
    a voltage reference source connected to the first voltage divider and a second voltage divider;
    a second comparator connected to the second voltage divider; and
    a NOR logic gate connected to the first comparator and the pulse stretcher.

6. The system of claim 5 further comprising a Central Processing Unit (CPU) connected to the first comparator, the second comparator, and digital control circuits contained within the power monitor and logic control circuitry.

7. The system of claim 6, wherein the CPU is connected to a user-operated external controller.

8. The system of claim 1, wherein each of the plurality of signal component conditioning circuits further comprises a channel processing switch connected to the input of both the time domain processing circuitry and the frequency domain processing circuitry.

9. The system of claim 8, wherein the frequency domain processing circuitry comprises:
    a first transfer switch connected to a first filter and the channel processing switch;
    a second transfer switch connected to the first transfer switch and a second filter;

a limiter connected to the second transfer switch and a first variable attenuator; and an amplifier connected to the first variable attenuator and a second variable attenuator, the second variable attenuator connected to the channel switch.

10. The system of claim 1, wherein each of the plurality of signal component conditioning circuits further comprise output power detection circuitry connected to the channel switch and the frequency multiplexer.

11. The system of claim 10, wherein the output power detection circuitry comprises a directional coupler connected to the channel switch, the frequency multiplexer, and a log video detector, the log video detector connected to the control signal generation circuitry.

12. The system of claim 1 further comprising:
a directional coupler operatively connected to the output of the frequency demultiplexer; and
input power detection circuitry operatively connected to the directional coupler.

13. The system of claim 1 further comprising a CPU operatively connected to the control signal generation circuitry, wherein the CPU contains software stored therein to automatically adjust the components of the time domain processing circuitry and the frequency domain processing circuitry in response to detection of the portion of the signal component exceeding the reference signal.

14. The system of claim 1 further comprising a CPU operatively connected to the control signal generation circuitry and an external controller, wherein the CPU is configured to receive user-generated inputs from the external controller, and based upon the user-generated inputs, adjust the components of the time domain processing circuitry and the frequency domain processing circuitry.

15. A system comprising:
a frequency demultiplexer configured to separate an input signal into a plurality of different signal components in respective contiguous frequency channels, each frequency channel comprising an octave or less of bandwidth;
a plurality of signal component conditioning circuits operatively connected to the frequency demultiplexer, each signal component conditioning circuit corresponding to a separate frequency channel and comprising
a directional coupler operatively connected to the output of the frequency demultiplexer,
input power detection circuitry operatively connected to the directional coupler,
a channel processing switch operatively connected to the directional coupler,
time domain processing circuitry and frequency domain processing circuitry operatively connected to the output of the channel processing switch,
a channel switch operatively connected to the output of both the time domain processing circuitry and the frequency domain processing circuitry, and
control signal generation circuitry, operatively connected to the input power detection circuitry, configured to generate a control signal to open a digital switch contained within the time domain processing circuitry and connected to the channel switch if any portion of the signal component exceeds a reference voltage signal, the time domain processing circuitry configured to delay the signal component for a predetermined time to prevent the portion of the signal component exceeding the reference voltage signal from passing to the digital switch until the digital switch is open; and
a frequency multiplexer, operatively connected to the channel switch of each of the plurality of signal component conditioning circuits, configured to combine the output of each of the signal component conditioning circuits into an output signal.

16. The system of claim 15, wherein each of the plurality of signal component conditioning circuits further comprise output power detection circuitry connected to the channel switch and the frequency multiplexer, wherein the output power detection circuitry comprises a directional coupler connected to the channel switch, the frequency multiplexer, and a log video detector, the log video detector connected to the control signal generation circuitry.

17. The system of claim 15 further comprising a CPU operatively connected to the control signal generation circuitry, wherein the CPU contains software stored therein to automatically adjust the components of the time domain processing circuitry and the frequency domain processing circuitry in response to detection of the portion of the signal component exceeding the reference signal.

18. A method comprising the steps of:
separating a received signal into a plurality of different signal components in respective contiguous frequency channels, each frequency channel comprising an octave or less of bandwidth;
for each signal component, simultaneously routing the signal component through both time domain processing circuitry and routing a sample of the signal component through control signal generation circuitry;
delaying, via the time domain processing circuitry, the signal component for a predetermined time to allow for the generation of a control signal by the control signal generation circuitry using the sampled signal component; and
opening, via the control signal, a digital switch contained within the time domain processing circuitry if any portion of the sampled signal component exceeds a reference voltage signal.

19. The method of claim 18 further comprising the step of, when the digital switch is closed, routing the output of the time domain processing circuitry to a channel switch operatively connected to a frequency channel multiplexer.

20. The method of claim 19 further comprising the steps of:
combining, via the frequency channel multiplexer, the output of each frequency channel into an output signal; and
transmitting the output signal over a transmission line.

* * * * *